United States Patent [19]

Haskins et al.

[11] Patent Number: 4,653,737
[45] Date of Patent: Mar. 31, 1987

[54] FOOD TRIMMING AND PREPARATION DEVICE

[76] Inventors: L. Arthur Haskins; Carolyn R. Haskins, both of 22622-90th W., Edmonds, Wash. 98020

[21] Appl. No.: 818,954

[22] Filed: Jan. 15, 1986

[51] Int. Cl.⁴ ............................................. B23Q 3/00
[52] U.S. Cl. ...................................... 269/13; 269/15; 269/289 R; 269/302.1
[58] Field of Search ............. D7/46, 47; 248/99, 101; 108/24, 26, 90, 50; 312/211, 232; 269/289 R, 302.1, 13, 15, 16

[56] References Cited

U.S. PATENT DOCUMENTS

| D. 161,596 | 1/1951 | Russ. | |
|---|---|---|---|
| D. 259,166 | 5/1981 | Krusche. | |
| D. 265,537 | 7/1982 | Stockdale. | |
| D. 283,777 | 5/1986 | Morin | D7/46 |
| 3,785,008 | 1/1974 | Parker. | |
| 4,041,964 | 8/1977 | Shamoon. | |
| 4,273,318 | 6/1981 | Crowhurst. | |
| 4,488,697 | 12/1984 | Garvey | 248/101 |
| 4,500,150 | 2/1985 | Liebensperger et al. | 108/50 |

OTHER PUBLICATIONS

Namaur Enterprises Catalogue.

*Primary Examiner*—Robert C. Watson
*Attorney, Agent, or Firm*—Kenneth R. Bullock

[57] ABSTRACT

A device for the trimming, cutting and cleanup of foodstuffs uses a flat surfaced cutting board with at least one aperture therethrough for removing food scraps to a first storage area beneath the cutting board and for removing useable food portions separately to a second storage area beneath the cutting board. One of the storage areas is a catch basin while the other storage area is alternately a partitioned area of the same catch basin, a second catch basin or a receptacle bag or dish.

1 Claim, 10 Drawing Figures

FOOD TRIMMING AND PREPARATION DEVICE

BACKGROUND OF THE INVENTION

1. Field

This invention is in the field of food preparation and more specifically in the field of food trimming and cutting devices and methods.

2. Prior Art

Food preparation can be a time consuming, messy task. One of the most basic duties of food preparation is the trimming and cutting of foodstuffs on the kitchen cutting board or "bread board". Cutting boards of the prior art generally do not provide a method or device for the convenient separation of useable food portions from food scrap and more specifically differ in the following manner from the device of the present invention:

U.S. Pat. No. 4,273,318 to Crowhurst discloses a detachable storage area for cutting boards. The device is different from the present invention in that it has only one storage area and is not positioned beneath the cutting board.

U.S. Pat. No. 4,041,964 to Shamoon discloses a cutting board with one storage area protruding above the cutting board surface. In addition, the device is specific to the sink.

U.S. Pat. No. Des. 265,537 to Stockdale disloses a cutting board with no means of storage.

U.S. Pat. No. Des. 161,596 to Russ discloses a cutting board with only one storage area.

U.S. Pat No. Des. 259,166 to Krusche discloses a cutting board with a storage area protruding above the cutting board surface.

U.S. Pat. No. 3,785,008 to Parker discloses a receptacle bag holding device which is comprised of several clips and not the holding ring or support of the present invention.

SUMMARY

A device for the preparation and cleanup of trimmed and cut foodstuffs and a method for doing the same uses a flat surfaced cutting board with at least one aperture therethrough for removing food scraps to a first storage area and for removing useable food portions such as chopped vegetables to a second storage area. In one embodiment, the food scraps and useable food portions are removed to separate storage areas by moving the first and second storage areas alternately beneath the aperture. In another embodiment, separate apertures are provided for food scraps and useable food portions and the separate storage areas remain in place. The separate storage areas may be a single catch basin with partitions, dual catch basins or a single catch basin in combination with a dish or receptacle bag.

BRIEF DESCRIPTION

DETAILED DESCRIPTION

Figure 1:
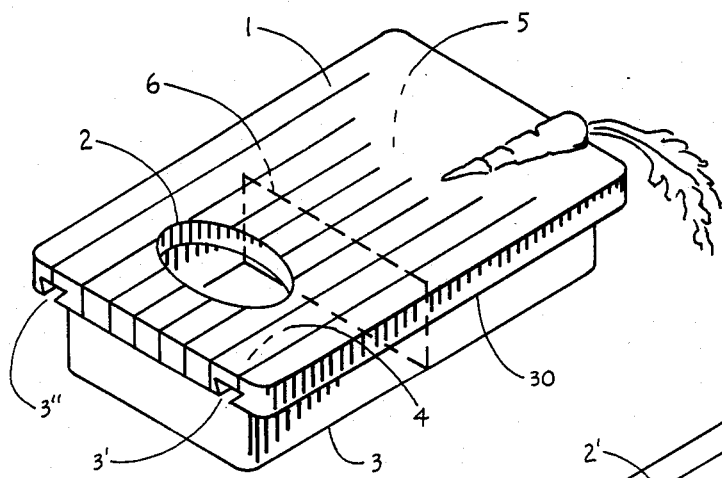
FIG. 1 shows an embodiment with a single catch basin and a single aperture.

Referring to the drawings wherein like numbers refer to like parts, a form of the basic device of this invention is shown in FIG. 1. A cutting board 1 which may be made of a plastic or wood or the like has an aperture 2 therethrough and a catch basin 3 slidably engaged by means of channels 3' and 3" with the bottom surface 30 of the cutting board 1 so that the basin 3 is easily separable from the cutting board 1. The basin 3 has first and second storage areas 4 and 5 separated by the partition 6 across the width of basin 3. In use, foods are chopped or otherwise prepared on the cutting board 1 and then pushed through the apertuee 2 to one of the storage areas, 4 or 5 of the basin 3. The basin 3 is then reversed so that the other storage area, 4 or 5 is positioned beneath the aperture 2 and the food scrap is removed though the aperture 2 to the storage area 4 or 5. Whether the food scrap is removed first to its respective storage area or useable food portion is removed to the storage areas first is obviously immaterial to the invention, but an important and useful aspect of the invention is that there are separate storage areas for the useable food and the food scrap.

Figure 2:
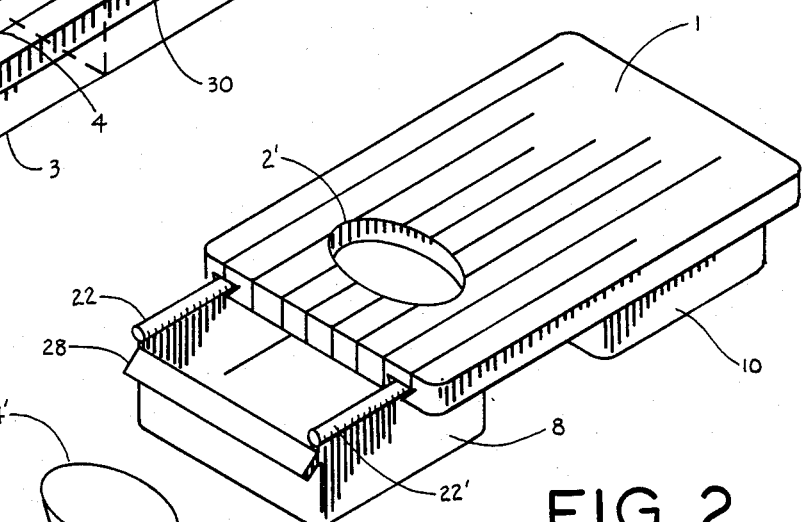
FIG. 2 shows dual catch basins and a single aperture.

A second embodiment is shown in FIG. 2. The storage areas 4 and 5 of FIG. 1 are here the separate basins 8 and 10. Each of the basins 8 and 10 are slidably engaged with the cutting board 1 and each basin 8 or 10 can be positioned beneath the aperture 2' to receive the prepared food or food scrap. In use, one of the basins 8 or 10 is first positioned beneath the aperture 2' to receive either the food scrap or the useable food portions and the other basin 8 or 10 is then positioned beneath the aperture 2' to receive that which remains on the cutting board surface 1.

Figure 3:
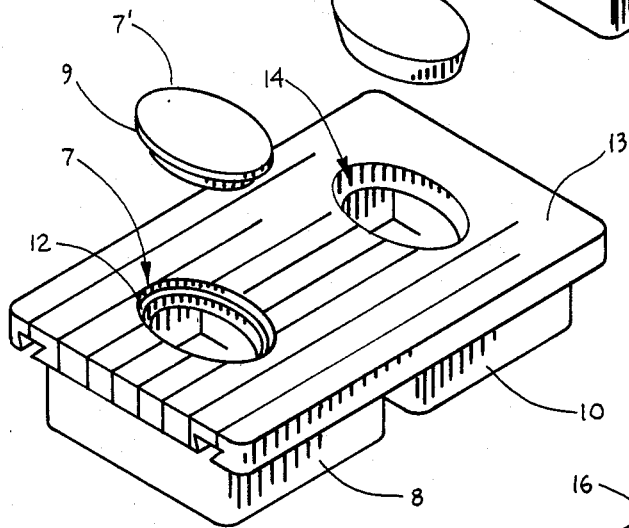
FIG. 3 shows dual apertures with dual catch basins.

FIG. 3 discloses a third embodiment wherein dual apertures 7 and 14 are shown positioned directly over the respective basins 8 and 10. The dual basins 8 and 10 are here slidably engaged but need to be removed only after both the prepared food and food scrap is received. In this embodiment, the basins 8 and 10 need not be interchanged beneath a single aperture as in FIGS. 1 and 2. In use, the basins 8 and 10 remain in place while the useable food and food scrap is separately removed or pushed through the apertures 7 and 14. Also shown in this FIG. 3 are plug inserts 7' and 14' which are sized for form fitting into the respective apertures 7 and 14. The plug 14' is tapered while the plug 7' has a lip 9 which rests upon the inner ledge 12 within the aperture 7. The plug 7' need not be tapered to any extent. When inserted into its respective aperture, either plug 7' or 14' will serve to enlarge upon the useable surface area of the cutting board.

Figure 4:
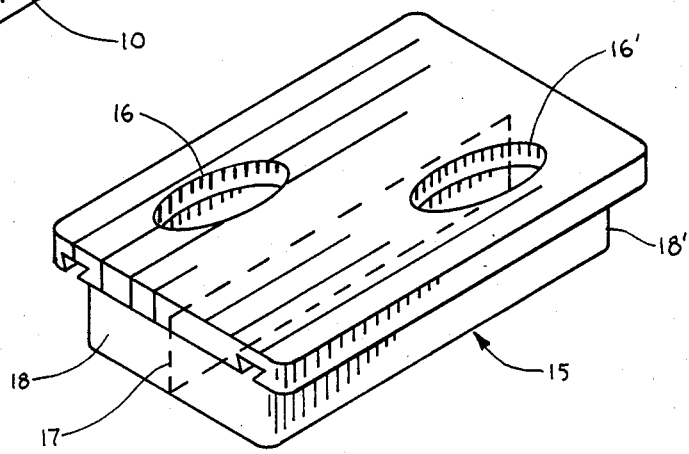
FIG. 4 shows dual apertures with a single catch basin.

FIG. 4 discloses another embodiment of the present invention where the apertures 16 and 16' are positioned laterally along the length of the cutting board, and where the partition 17 that bisects the single basin 15 is centrally located and positioned laterally also. The device of FIG. 4 permits the user to obtain both the food scrap and the useable food portions by tipping the basin 15 upon one of its ends 18 or 18′, whereupon the useable food portions and food scrap will fall towards one end 18 or 18′ and can both be removed from one end 18 or 18′.

Figure 5:
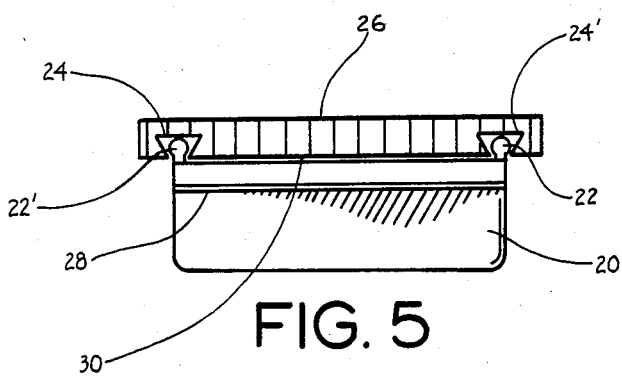
FIG. 5 shows the preferred sliding engagement between the cutting board and the catch basin.
Figure 6:
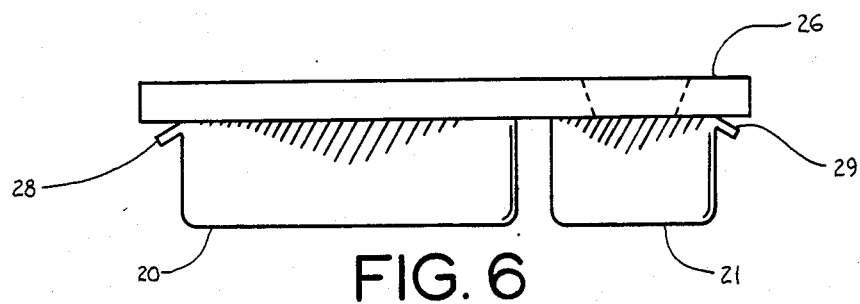
FIG. 6 shows the depending handles as attached to the catch basins.
Figure 9:
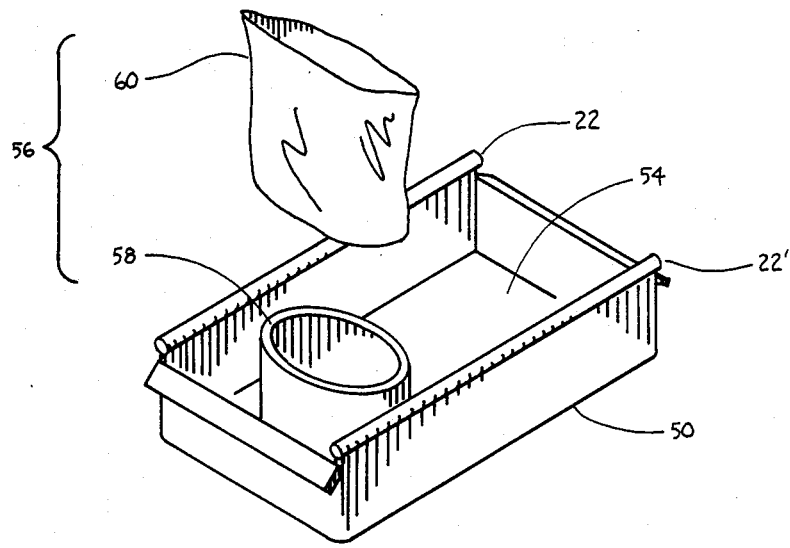
FIG. 9 shows an alternate receptacle bag holding embodiment.
Figure 10:
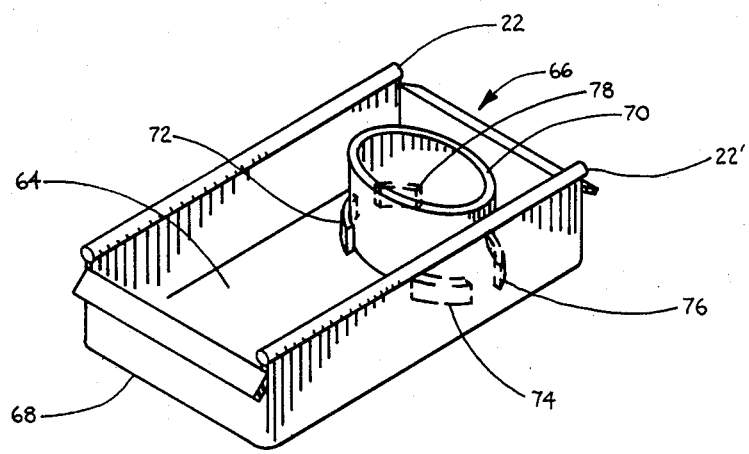
FIG. 10 shows a dish and its holder as an alternate storage area.

FIG. 5 discloses the preferred means of slidable engagement between the cutting board 26 and the basin 20. The cutting board 26 is shown to have dual dovetail channels 24 and 24′ grooved into the bottom surface 30. The channels 24 and 24′ extend laterally along the cutting board 26 and receive the semicircular protruding sides 22 and 22′ of the basin 20. The semicircular protruding sides 22 and 22′ are also shown in FIGS. 2, 9 and 10. These channels 24 and 24′ provide the device with an easily manufactured means of slidable engagement. In addition, as shown in FIG. 6, a handle 28 of the basin 20 depends from the front edge of the basin 20 so that the basin is readily removeable. As shown in the FIG. 6, both catch basins 20 and 21 may have the respective depending handles 28 and 29 for ease in their removal. The depending handle 28 is also shown in FIG. 2.

Figure 7:
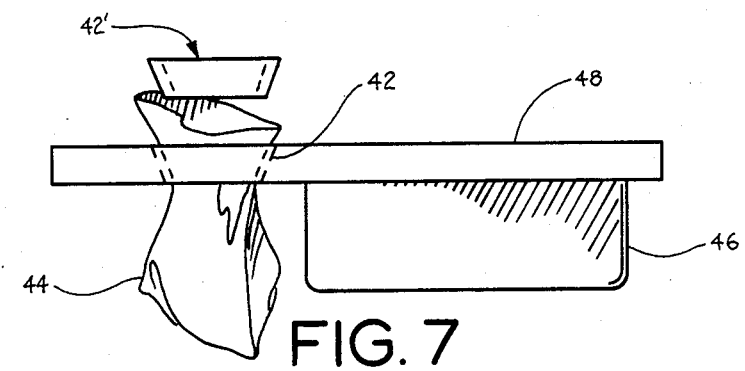
FIG. 7 shows the embodiment wherein one storage area is a receptacle bag and the second storage area is a basin positioned separately from the bag.
Figure 8:
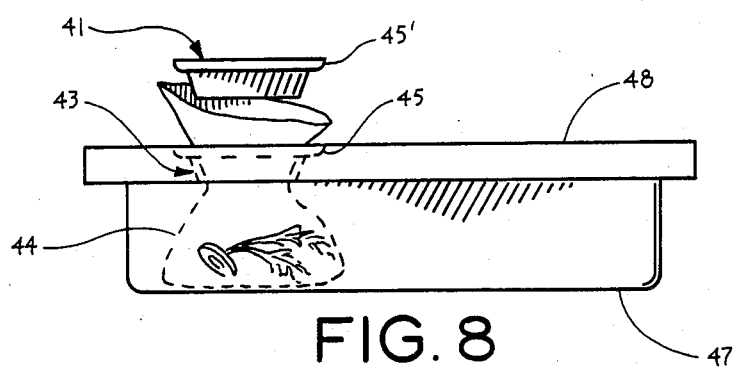
FIG. 8 shows the embodiment wherein one storage area is a receptacle bag and the second storage area is a basin positioned beneath the receptacle bag.

Shown in FIGS. 7 and 8 is a preferred embodiment of the storage areas in the device of this invention. The basin 46 in FIG. 7 and the basin 47 in FIG. 8 form one storage area and the receptacle bag 44 in both FIGS. 7 and 8 forms the second storage area. In FIG. 7 a holding ring 42′ is sized for an interference engagement with the sides of a tapering aperture 42 in the cutting board 48. The preferred taper of the holding ring 42′ is about 10 degrees. The receptacle bag 44 is fitted between the holding ring 42′ and tapered aperture 42 so that food or food scraps may be removed to and stored in the receptacle 44. The holding ring 42′ is preferably of a flexible yet resilient material which can be deformed for fitting into the aperture 42 and yet will regain its shape within the aperture 42. In FIG. 8, the holding ring 41 is sized for form fitting within the aperture 43. The lip 45′ of the holding ring 41 is sized for the recess 45 of the aperture 43. The recess 45 in the cutting board 48 is provided so that the lip 45′ on the holding ring 41 may be slipped on top of the bag 44 within the aperture 43 for securely holding the bag 44. Lip 45′ of the holding ring 41 is also provided so that the holding ring 41 is prevented from slipping too deeply within the aperture 43. In the embodiment of FIG. 7, the storage areas 44 and 46 are necessarily interchanged beneath the aperture 42 so that both useable food portions and food scrap may be separately obtained. In the embodiment of FIG. 8, the storage area comprising the basin 47 is available once the receptacle bag 44 is removed.

FIG. 9 discloses a basin 50 with a first storage area 54 and a second storage area 56 comprised of a receptacle support 58 and a receptacle bag 60 where the bag 60 is held within the support 58 for receiving food portions or scrap. In use, the bag 60 is placed into the support 58 so that the bag 60 is slightly draped over the support 58. The bag 60 may thus be easily placed and removed. The receptacle support 58 is preferably semicircular in shape, though it is anticipated that other shapes would achieve the same effect. The receptacle 58 in addition is integrally molded with the basin 50 or otherwise attached as is commonly known in the art.

FIG. 10 discloses a basin 68 with a first storage area 64 and a second storage area 66 comprised of a receptacle dish 70 and supports 72,74,76 and 78 for supporting the dish 70. The dish 70 may thus be easily replaced and removed in its service as one of the storage areas.

It is anticipated that modifications and variations of the presently disclosed invention could be judged as equivalent and therefore covered by the nature and scope of the claims.

I claim:

1. A device used for the preparation of vegetables and other foods wherein the food scrap is separated from the useable food portions comprises a flat surfaced cutting board having at least one aperture therethrough for separately removing the food scrap and useable food portions to first and second storage areas beneath the board with;

said aperture having an encircling recessed area at the top surface of the cutting board;

a holding ring having an encircling overhanging lip for form fitting into the recess of the aperture;

the first storage area comprised of a single catch basin slidably engaged to a bottom surface of the cutting board;

the second storage area comprised of a receptacle bag for form fitting between the holding ring and aperture such that the receptacle bag is held fast between the aperture and the holding ring.

* * * * *